United States Patent
Yamada et al.

(10) Patent No.: US 7,162,412 B2
(45) Date of Patent: Jan. 9, 2007

(54) MULTILINGUAL CONVERSATION ASSIST SYSTEM

(75) Inventors: Toyomichi Yamada, Omiya (JP); Takahide Tamura, Toyonaka (JP)

(73) Assignee: Evidence Corporation, Tokyo (JP)

( * ) Notice: Subject to any disclaimer, the term of this patent is extended or adjusted under 35 U.S.C. 154(b) by 896 days.

(21) Appl. No.: 10/007,671

(22) Filed: Dec. 10, 2001

(65) Prior Publication Data

US 2003/0097251 A1    May 22, 2003

(30) Foreign Application Priority Data

Nov. 20, 2001  (JP)  ............................ 20001-355157

(51) Int. Cl.
  *G06F 17/28*  (2006.01)
  *G06F 17/20*  (2006.01)

(52) U.S. Cl. .............................. 704/7; 704/8

(58) Field of Classification Search ............ None
  See application file for complete search history.

(56) References Cited

U.S. PATENT DOCUMENTS 5,576,953 A * 11/1996 Hugentobler .................. 704/2
5,875,421 A * 2/1999 Takeuchi ....................... 704/2
6,622,123 B1 * 9/2003 Chanod et al. ............. 704/277
2002/0046035 A1 * 4/2002 Kitahara et al. ............ 704/277
2002/0059056 A1 * 5/2002 Appleby ........................ 704/4
2002/0087302 A1 * 7/2002 Tomaru ......................... 704/8
2002/0111791 A1 * 8/2002 Candelore ..................... 704/7
2002/0198700 A1 * 12/2002 Mestre .......................... 704/2
2003/0046059 A1 * 3/2003 Litster et al. .................. 704/8
2003/0135358 A1 * 7/2003 Lissauer et al. ............... 704/2

FOREIGN PATENT DOCUMENTS

JP  2042570   2/1990
JP  10069484  3/1998
JP  11238063  8/1999

* cited by examiner

*Primary Examiner*—David Hudspeth
*Assistant Examiner*—Matthew J. Sked
(74) *Attorney, Agent, or Firm*—Whitham, Curtis, Christofferson & Cook, P.C.

(57) ABSTRACT

A multilingual conversation database has subdatabases set according to a combination of languages different from each other for use in a conversation. Each of the subdatabases has a first area for setting a conversational situation and a second area for storing units of languages likely to be used for respective situations; if the situation in the first area is selected, a language unit in the second area corresponding to the situation is displayed. A multilingual conversation system comprises the multilingual conversation database and a communication facility into which the database is downloaded.

17 Claims, 16 Drawing Sheets

| SCENE IDENTIFICATION | DISPLAY SEQUENCE | WORD IDENTIFI- CATION NUMBER | NEXT-STAGE QUERY IDEN- TIFICATION | NEXT-STAGE DISPLAY TYPE IDENTIFICATION |
|---|---|---|---|---|
| 1 0 1 | 1 | 1 4 | 2 | 1 0 |
| 1 0 2 | 2 | 1 5 | 2 | 1 0 |
| 1 0 3 | 3 | 1 6 | 2 | 2 0 |
| 1 0 4 | 4 | 1 7 | 2 | 2 0 |

FIG. 7

| WORD IDENTIFI- CATION NUMBER | IMAGE DISPLAY FILE NAME | CONCEPTION |
|---|---|---|
| 1 4 | airport.gif | airport |
| 1 5 | transfer.gif | transfer |
| 1 6 | greeting.gif | greetings |
| 1 7 | shopping.gif | shopping |

| WORD IDENTIFI-CATION NUMBER | JAPANESE CHARACTER DISPLAY |
|---|---|
| 1 4 | airport_jpn_c.gif |
| 1 5 | transfer_jpn_c.gif |
| 1 6 | greeting_jpn_c.gif |
| 1 7 | shopping_jpn_c.gif |

201 — WORD IDENTIFICATION NUMBER
202 — JAPANESE CHARACTER DISPLAY
211, 212, 213, 214

| BASIC TABLE WORD IDENTIFICATION NUMBER | BASIC TABLE IMAGE DISPLAY FILE NAME | SCENE SELECT TABLE SCENE IDENTIFICATION | SCENE SELECT TABLE DISPLAY SEQUENCE | SCENE SELECT TABLE NEXT-STAGE QUERY IDENTIFICATION | SCENE SELECT TABLE NEXT-STAGE DISPLAY TYPE IDENTIFICATION | JAPANESE LANGUAGE TABLE JAPANESE CHARACTER DISPLAY |
|---|---|---|---|---|---|---|
| 1 4 | airport.gif | 1 0 1 | 1 | 2 | 1 0 | airport_jpn_c.gif |
| 1 5 | transfer.gif | 1 0 2 | 2 | 2 | 1 0 | transfer_jpn_c.gif |
| 1 6 | greeting.gif | 1 0 3 | 3 | 2 | 2 0 | greeting_jpn_c.gif |
| 1 7 | shopping.gif | 1 0 4 | 4 | 2 | 2 0 | shopping_jpn_c.gif |

| NEXT-STAGE QUERY IDENTIFICATION | NEXT-STAGE QUERY NAME |
|---|---|
| 2 | 2ND-STAGE OPTION QUERY |
| 3 | 3RD-STAGE OPTION QUERY |

| SCENE IDENTIFI-CATION | LANGUAGE UNIT IDEN-TIFICATION | DISPLAY SEQUENCE | WORD IDEN-TIFICATION NUMBER | LANGUAGE UNIT CON-NECTION | NEXT-STAGE QUERY IDEN-TIFICATION | NEXT-STAGE DISPLAY TYPE IDENTIFICATION |
|---|---|---|---|---|---|---|
| 101 | 201 | 1 | 34 | 0 | 0 | 0 |
| 101 | 202 | 2 | 55 | 0 | 0 | 0 |
| 101 | 203 | 3 | 48 | 0 | 0 | 0 |
| 101 | 204 | 4 | 60 | 0 | 0 | 0 |

| BASIC TABLE WORD IDENTIFICATION NUMBER | BASIC TABLE IMAGE DISPLAY FILE NAME | SCENE SELECT TABLE SCENE IDENTIFICATION | SCENE SELECT TABLE DISPLAY SEQUENCE | SCENE SELECT TABLE NEXT-STAGE QUERY IDENTIFICATION | SCENE SELECT TABLE NEXT-STAGE DISPLAY TYPE IDENTIFICATION | JAPANESE LANGUAGE TABLE JAPANESE CHARACTER DISPLAY |
|---|---|---|---|---|---|---|
| 1 4 | airport.gif | 1 0 1 | 1 | 2 | 2 0 | airport_jpn_c.gif |
| 1 5 | transfer.gif | 1 0 2 | 2 | 2 | 2 0 | transfer_jpn_c.gif |
| 1 6 | greeting.gif | 1 0 3 | 3 | 2 | 2 0 | greeting_jpn_c.gif |
| 1 7 | shopping.gif | 1 0 4 | 4 | 2 | 2 0 | shopping_jpn_c.gif |

FIG. 22

| 2ND-STAGE OPTION TABLE SCENE IDENTIFICATION | 2ND-STAGE OPTION TABLE LANGUAGE UNIT IDENTIFICATION | 2ND-STAGE OPTION TABLE DISPLAY SEQUENCE | BASIC TABLE WORD IDENTIFICATION NUMBER | BASIC TABLE IMAGE DISPLAY FILE NAME | 2ND-STAGE OPTION TABLE LANGUAGE UNIT CONNECTION | 2ND-STAGE OPTION TABLE NEXT-STAGE QUERY IDENTIFICATION | 2ND-STAGE OPTION TABLE NEXT-STAGE DISPLAY TYPE IDENTIFICATION | JAPANESE LANGUAGE TABLE JAPANESE CHARACTER DISPLAY |
|---|---|---|---|---|---|---|---|---|
| 101 | 301 | 1 | 3 4 | immigration.gif | 1 | 3 | 3 0 | immigration_jpn_c.gif |
| 101 | 302 | 2 | 5 5 | custom.gif | 1 | 3 | 3 0 | custom_jpn_c.gif |
| 101 | 303 | 3 | 4 8 | passport.gif | 1 | 3 | 3 0 | passport_jpn_c.gif |
| 101 | 304 | 4 | 6 0 | hospital.gif | 1 | 3 | 3 0 | hospital_jpn_c.gif |

FIG. 23

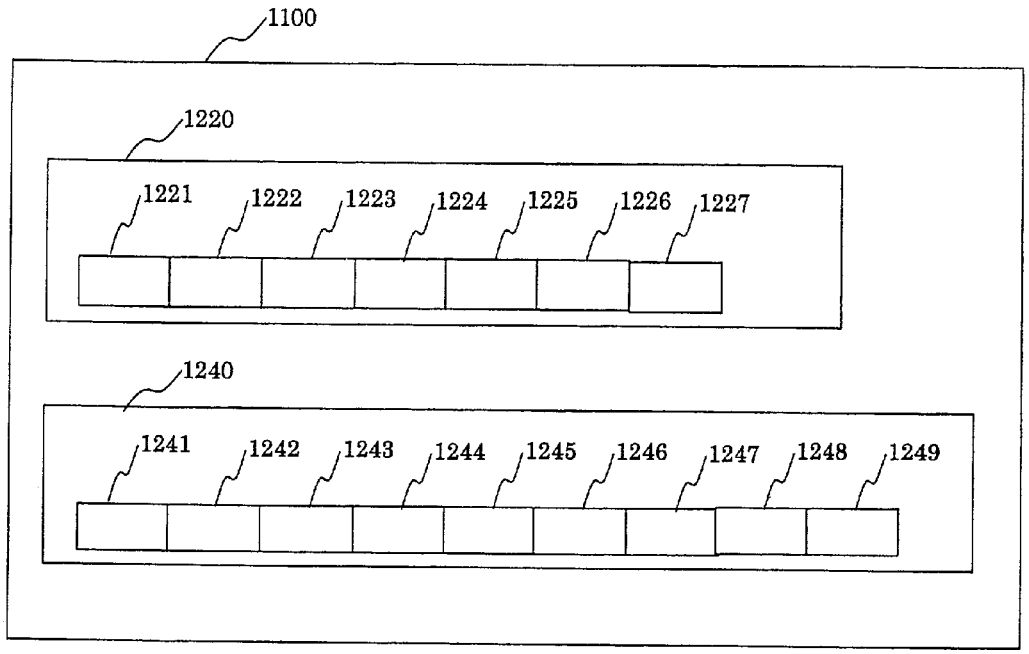

FIG. 24

| 1241 | 1242 | 1243 | 1244 | 1245 | 1246 | 1247 | 1248 | 1249 |
|---|---|---|---|---|---|---|---|---|
| 3RD-STAGE OPTION TABLE PREVIOUS-STAGE LANGUAGE UNIT IDENTIFICATION | 3RD-STAGE OPTION TABLE LANGUAGE UNIT IDENTIFICATION | 3RD-STAGE OPTION TABLE DISPLAY SEQUENCE | BASIC TABLE WORD IDENTIFICATION NUMBER | BASIC TABLE IMAGE DISPLAY FILE NAME | 3RD-STAGE OPTION TABLE LANGUAGE UNIT CONNECTION | 3RD-STAGE OPTION TABLE NEXT-STAGE QUERY IDENTIFICATION | 3RD-STAGE OPTION TABLE NEXT-STAGE DISPLAY TYPE IDENTIFICATION | JAPANESE LANGUAGE TABLE JAPANESE CHARACTER DISPLAY |
| 304 | 501 | 1 | 311 | where_is.gif | 0 | 0 | 0 0 | where_is_jpn_c.gif |
| 304 | 502 | 2 | 312 | I_want_to_go.gif | 0 | 0 | 0 0 | I_want_to_go_jpn_c.gif |

FIG. 25

| 2ND-STAGE OPTION TABLE SCENE IDENTIFICATION | 2ND-STAGE OPTION TABLE LANGUAGE UNIT IDENTIFICATION | 2ND-STAGE OPTION TABLE DISPLAY SEQUENCE | BASIC TABLE WORD IDENTIFICATION NUMBER | BASIC TABLE IMAGE DISPLAY FILE NAME | 2ND-STAGE OPTION TABLE LANGUAGE UNIT CONNECTION | 2ND-STAGE OPTION TABLE NEXT-STAGE QUERY IDENTIFICATION | 2ND-STAGE OPTION TABLE NEXT-STAGE DISPLAY TYPE IDENTIFICATION | JAPANESE LANGUAGE TABLE JAPANESE CHARACTER DISPLAY | 2ND-STAGE OPTION TABLE SENTENCE ELEMENT |
|---|---|---|---|---|---|---|---|---|---|
| 101 | 301 | 1 | 34 | immigration.gif | 1 | 3 | 30 | immigration_jpn_c.gif | 0 |
| 101 | 302 | 2 | 55 | custom.gif | 1 | 3 | 30 | custom_jpn_c.gif | 0 |
| 101 | 303 | 3 | 48 | passport.gif | 1 | 3 | 30 | passport_jpn_c.gif | 0 |
| 101 | 304 | 4 | 60 | hospital.gif | 1 | 3 | 30 | hospital_jpn_c.gif | 0 |

FIG. 28

MULTILINGUAL CONVERSATION ASSIST SYSTEM

BACKGROUND OF THE INVENTION

The present invention relates to a multilingual conversation system that can enjoy a conversation between a plurality of languages and, more particularly, to a multilingual conversation system that can be effectively used during overseas travels or the like.

In general, it is hard for people other than native speakers to master a foreign language perfectly. This becomes a bar to cultural or perceptional exchanges particularly between Japanese people and the other people in different countries at present. On the other hand, it is anticipated that the wave of globalization would enlarge opportunities of having a conversation with foreigners, and also would increase the necessity of mutual understanding between people in various countries.

Conventionally, as portable devices that make multilingual conversations possible, some devices have been proposed such that a usage sentence of, for example, Japanese which is appropriate for a conversational scene is selected to be translated, for example, into English, to be then displayed on a screen in the form of an English sentence, and to be converted into voice of the displayed English sentence. In these portable devices, it is also possible to display simple greetings or the like in a foreign language corresponding to Japanese and to generate their voices.

As set forth in the above, the intention of the conventionally used portable devices is directed to making a foreigner, who is a partner of the conversation, understand a speaker's talk by translating a native language into a foreigner's language and by announcing a translated sentence and the like on a display screen or a voice. In other words, consideration is made in these conventional devices of this type only about grammatically faithfully translating words, sentences or the like of the speaker's native language.

Additionally, portable devices of this type have only a small number of conversational scenes together with a small number of sentences and words prepared for each scene. Furthermore, only a single sentence or a single word is selectable on the screen and these words are selected by scrolling the screen. Therefore, they are useless in a practical conversation requiring quick responses.

On the other hand, conversations do not always require accurate translations or there are many scenes in conversations where only a few words will be enough to understand a speaker's intention. For example, a meal scene at a restaurant or the like needs to order a desired dish by only telling a name of the desired dish to a waiter or waitress. In addition, a conversation in a shopping scene can be made by using a limited number of words. This is true of conversations between people from different countries speaking different languages. At any rate, there are many cases where sufficient mutual understanding can be accomplished among foreign people with different languages only by pronouncing words with the help of physical gesture, namely, a body language.

SUMMARY OF THE INVENTION

It is an object of the present invention to provide a multilingual conversation system that is usefully available to an actual conversation between people of different countries.

It is another object of the present invention to provide a database configuration that is available to a conversation between foreigners and that can realize rapid responses.

It is still another object of the present invention to provide a portable device that is practically utilized in a conversation between foreigners by using the database.

According to a first aspect of the present invention, there is provided a multilingual conversation database for use in a multilingual conversation enabling a conversation in a plurality of languages, comprising subdatabases set according to a combination of languages different from each other for use in a conversation, wherein each of the subdatabases has a first area for setting a conversational situation and a second area for storing units of languages likely to be used for respective situations and wherein selecting the situation in the first area enables a display of a language unit in the second area corresponding to the situation.

Furthermore, preferably image representation information and voice information corresponding to the language unit are stored in the second area of the subdatabase.

According to another aspect of the present invention, there is provided a multilingual conversation system having a server storing the above mentioned database. In this condition, there is provided a multilingual conversation system including a communication facility into which the database is downloaded by communicating with the server.

According to still another aspect of the present invention, there is provided a multilingual conversation system having a storage medium in which the database is previously stored.

According to another aspect of the present invention, there is provided a portable device having a storage device into which the database is previously incorporated.

BRIEF DESCRIPTION OF THE DRAWINGS

FIG. 7 is a diagram showing an example of records included in a scene selection table in the database of this multilingual conversation assist system.

FIG. 8 is a diagram showing an example of records included in the basic table in the database of this multilingual conversation assist system.

FIG. 9 is a diagram showing an example of records included in the Japanese language table in the database of this multilingual conversation assist system.

FIG. 10 is a diagram showing an example of records included in a scene selection query in the database of this multilingual conversation assist system.

FIG. 22 is a diagram showing a second example of records included in the scene selection query in the database of this multilingual conversation assist system.

FIG. 23 is a diagram showing a second example of records included in the second-stage option query in the database of this multilingual conversation assist system.

FIG. 24 is a diagram showing an example of an additional part of an area for storing data for setting a conversational situation in the database of this multilingual conversation assist system.

FIG. 25 is a diagram showing an example of records included in a third-stage option query in the database of this multilingual conversation assist system.

FIG. 28 is a diagram showing a third embodiment of records included in the second-stage option query of this multilingual conversation assist system.

DESCRIPTION OF PREFERRED EMBODIMENTS

Figure 1:
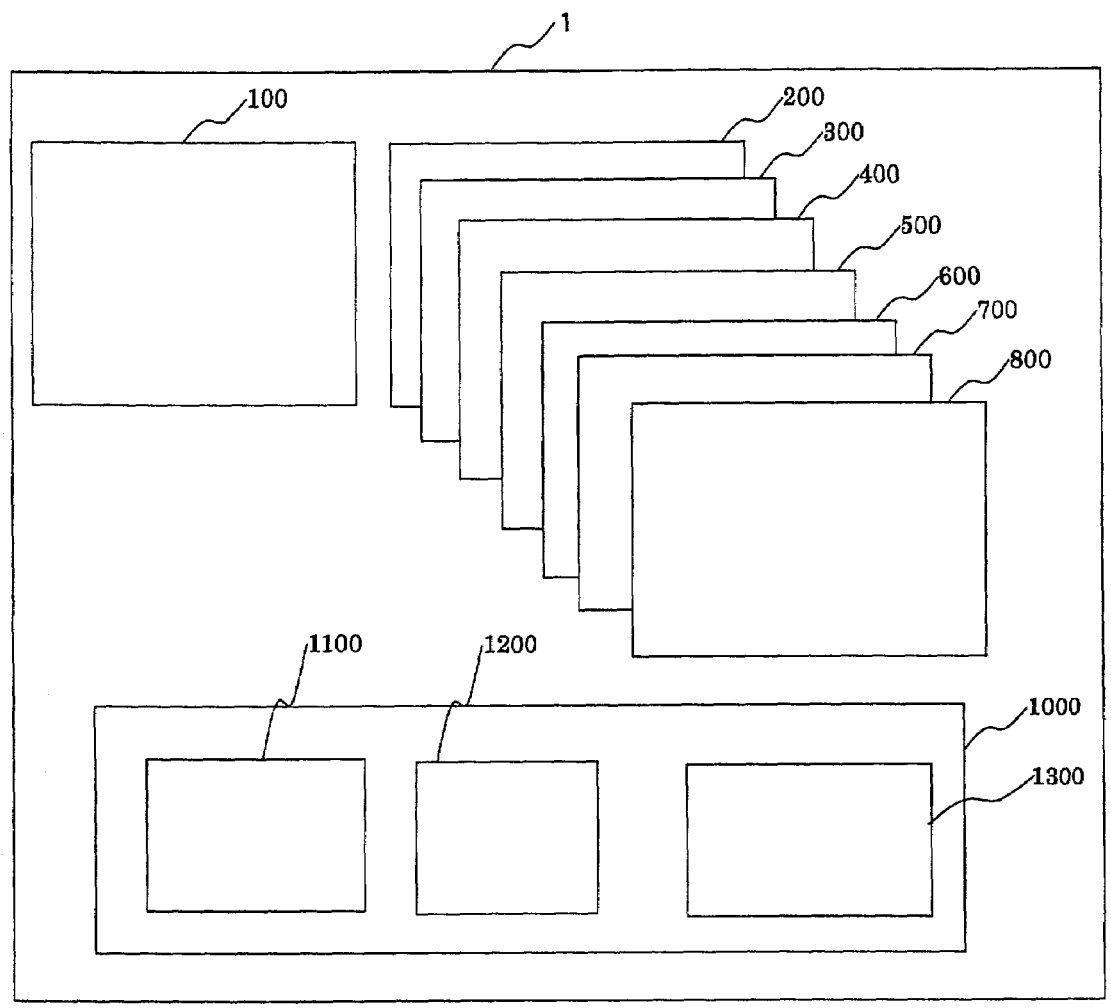
FIG. 1 is a diagram showing a typical structure of a database of a multilingual conversation assist system according to the present invention.

Referring to FIG. 1, there is shown a typical database structure for use in an embodiment of the present invention. The illustrated database 1 is available to a multilingual conversation that is made by the use of a plurality of languages. In this example, it is assumed that the database has a structure available to a conversation between two languages selected from a group consisting of Japanese, American English, Chinese, Korean, Indonesian, Thai, and Vietnamese. Therefore, the illustrated database 1 comprises a single basic table 100 storing a common conception of language to each of the languages and a plurality of tables 200 to 800 for storing language data for conversations in each language. The table 200 is assumed to be a Japanese language table for storing language data of the Japanese language. The remaining tables 300, 400, 500, 600, 700, and 800 are assumed to be prepared for storing language data of the American English, Chinese, Korean, Indonesian, Thai, and Vietnamese languages, respectively.

The multilingual conversation assist system is used for assisting or supporting a conversation between a first user understanding a first language and a second user understanding a second language. If Japanese is selected as the first language in the database 1, the second language may be sent to one of the remaining six languages, namely, American English, Chinese, Korean, Indonesian, Thai, and Vietnamese. If American English is selected as the first language, the second language can be set in a similar manner to either one of the remaining six languages, namely, Japanese, Chinese, Korean, Indonesian, Thai, and Vietnamese. In the example of the database 1 as mentioned above, the first language can be selected from seven languages while the second language can be also selected from six languages for each of the first languages. As a result, the number of combinations between the first and the second languages amounts to forty-two sets in total.

In the following embodiment, description will be made about the multilingual conversation assist system that will be applied to the case where the first language is Japanese and the second language is Indonesian.

A reference numeral 1000 shown in FIG. 1 designates a subdatabase for storing data available to a conversation between Japanese and Indonesian both of which are used as the first and the second languages, respectively. In the embodiment shown in FIG. 1, description is omitted regarding the remaining subdatabases for the forty-one language combinations.

The illustrated subdatabase 1000 contains an area 1100 for storing data for setting a conversational situation, a control section 1200 for storing a control program for reading the setting data of the conversation situation from the area 1100 to display the same and to request a user to select a conversational situation, and an area 1300 for storing language units that are used when the first language is Japanese and the second language is Indonesian.

Figure 2:
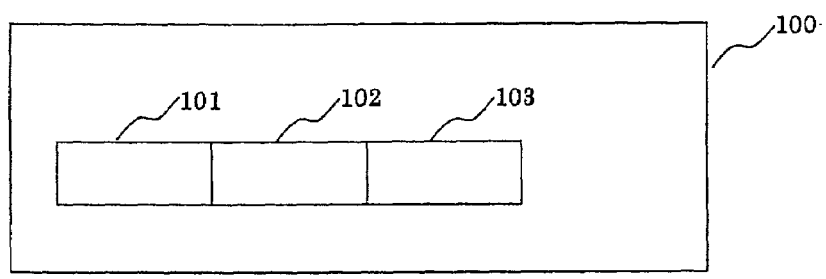
FIG. 2 is a diagram showing a typical structure of a basic table in the database of this multilingual conversation assist system.

Referring to FIG. 2, there is shown a typical structure of the basic table 100. The basic table can be implemented, for example, by the use of a relational database table. Reference numerals 101, 102, and 103 designate a word identification number field indicating an identification number of a word, an image display file name field indicating a file name of an image display corresponding to the word, and a conception field indicating a conception of the word, respectively. The word identification number field 101 is prepared to be used as a primary key. The basic table 100 has stored records having values corresponding to the respective fields. The number of records corresponds to the number of the language units handled by this multilingual conversation assist system.

Herein, it should be noted that the term "language unit" means a single word, such as "hospital," a combination of words, such as "want to go to," or a combination of more words, such as "hospital" and "want to go to." From the illustrated basic table 100, omission is made about records for storing respective field values related to respective language units. For example, the basic table 100 may have, as a 1001st record, a record that has a value "60" in the word identification number field 101, a value "hospital.gif" in the image display file name field 102, and a value "hospital" in the conception field 103.

Figure 3:
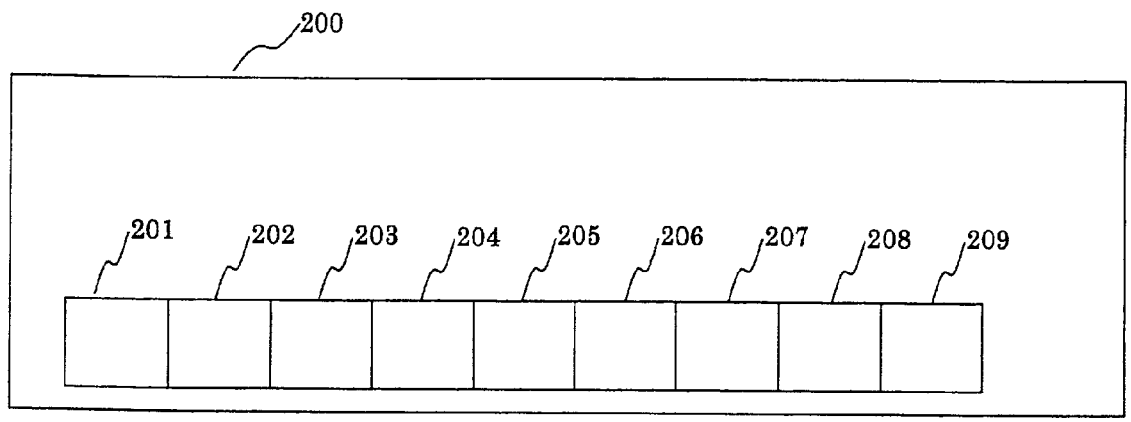
FIG. 3 is a diagram showing a typical structure of a Japanese language table in the database of this multilingual conversation assist system.

Referring to FIG. 3, there is shown a typical structure of the Japanese language table 200. The Japanese language table can be structured, for example, by the use of a relational database table. In this figure, a word identification number field is depicted by 201; a Japanese character display field indicating a character display in Japanese, 202; a Japanese voice field indicating a voice announcement in Japanese, 203; an American English phonetic expression field of a Japanese pronunciation, 204; a Chinese phonetic expression field of a Japanese pronunciation, 205; a Korean phonetic expression field of a Japanese pronunciation, 206; an Indonesian phonetic expression field of a Japanese pronounce, 207; a Thai phonetic expression field of a Japanese pronunciation, 208; and a Vietnamese phonetic expression field of a Japanese pronunciation, 209. The word identification number field 201 is operable as an external key and corresponds to the word identification number field 101 operable as the primary key in the basic table 100. The Japanese language table 200 has stored records specified by values corresponding to the respective fields. The number of records corresponds to the number of Japanese language units handled in the multilingual conversation assist system.

From the Japanese language table 200, omission is made about records for storing respective field values related to the Japanese language. For example, the 60th record on the Japanese language table 200 has a value "60" corresponding to the word identification number field 201, a value "hospital_jpn_c.gif" corresponding to the Japanese character display field 202, a value "hospital_jpn_v.wav" corresponding to the Japanese voice field 203, a value "hospital_jpn_usa.gif" corresponding to the American English phonetic expression field 204, a value "hospital_jpn_chn.gif" corresponding to the Chinese phonetic expression field 205, a value "hospital_jpn_kor.gif" corresponding to the Korean phonetic expression field 206, a value "hospital_jpn_idn.gif" corresponding to the Indonesian phonetic expression field 207, a value "hospital_jpn_tha.gif" corresponding to the Thai phonetic expression field 208, and a value "hospital_jpn_vnm.gif" corresponding to the Vietnamese phonetic expression field 209.

The value "60" corresponding to the word identification number field 201 indicates that this record on the Japanese language table 200 corresponds to a record having the same "60" value in the word identification field 101 on the basic table 100. In other words, the 60th record on the basic table 100 has stored data of the word "hospital" as a conception, while the 60th record on the Japanese language table 200 has stored data of a Japanese word corresponding to the word "hospital" as the conception. The value "hospital_jpn_c.gif" corresponding to the Japanese character display field 202 indicates a GIF format image file name for displaying a Japanese character display of a Japanese word "病院" of the conception "hospital." Letters "jpn" indicates a 3-character abbreviation label in Japanese. The value "hospital_jpn_v.wav" corresponding to the Japanese voice field 203 indicates a WAV format voice file name where Japanese voice "byouin" which is a Japanese pronunciation of the conception "hospital" is preserved. The value "hospital_jpn_usa.gif" corresponding to the American English phonetic expression field 204 indicates a GIF format image file name for displaying an American English phonetic expression of the Japanese pronunciation "byouin."Letters "usa" indicates a 3-character abbreviation label in American English. In the same manner regarding other languages, the values of the phonetic expression fields 205, 206, 207, 208, and 209 indicate GIF format image file names for displaying the pronunciation "byouin" in the phonetic expressions in Chinese, Korean, Indonesian, Thai, and Vietnamese, respectively. Characters "chn," "kor," "idn," "tha," and "vnm" are 3-character abbreviation labels in Chinese, Korean, Indonesian, Thai, and Vietnamese.

Figure 4:
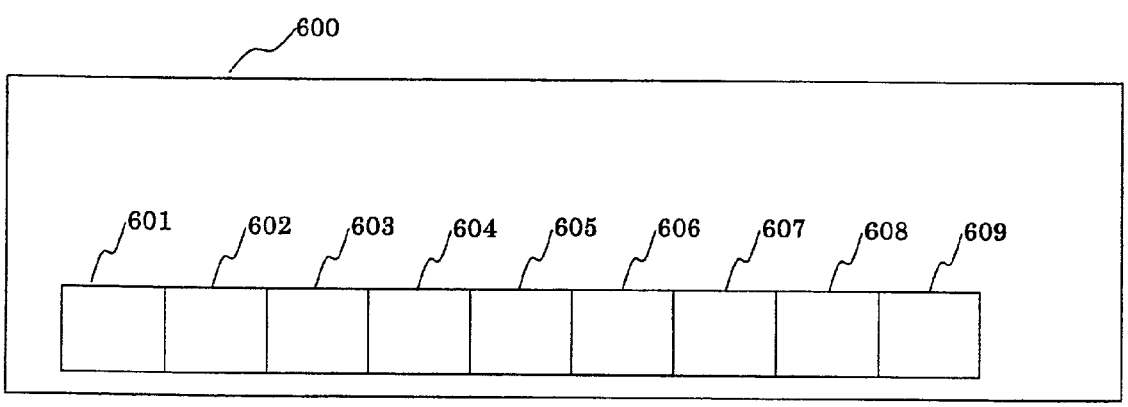
FIG. 4 is a diagram showing a typical structure of an Indonesian language table in the database of this multilingual conversation assist system.

Referring to FIG. 4, there is shown a typical structure of the Indonesian language table 600. The Indonesian language table 600 can be formed, for example, by the use of a relational database table. There are shown a word identification number field at 601, an Indonesian character display field indicating an Indonesian character display at 602, an Indonesian voice field indicating an Indonesian voice representation at 603, a Japanese phonetic expression field of an Indonesian pronunciation at 604, an American English phonetic expression field of the Indonesian pronunciation at 605, a Chinese phonetic expression field of the Indonesian pronunciation at 606, a Korean phonetic expression field of the Indonesian pronunciation at 607, a Thai phonetic expression field of the Indonesian pronunciation at 608, and a Vietnamese phonetic expression field of the Indonesian pronunciation at 609. The word identification number field 601 is operable as an external key and corresponds to the word identification number field 101 operable as the primary key in the basic table 100. The Indonesian language table has stored records each having values corresponding to the respective fields. The number of records corresponds to the number of Indonesian language units handled in the multilingual conversation assist system.

From the Indonesian language table 600, omission is made about records for storing respective fields of each Indonesian word. For example, the 60th record on the table 600 has a value "60" corresponding to the word identification number field 601, a value "hospital_idn_c.gif" corresponding to the Indonesian character display field 602, a value "hospital_idn_v.wav" corresponding to the Indonesian voice field 603, a value "hospital_idn_usa.gif" corresponding to the American English phonetic expression field 604, and the like.

Figure 5:
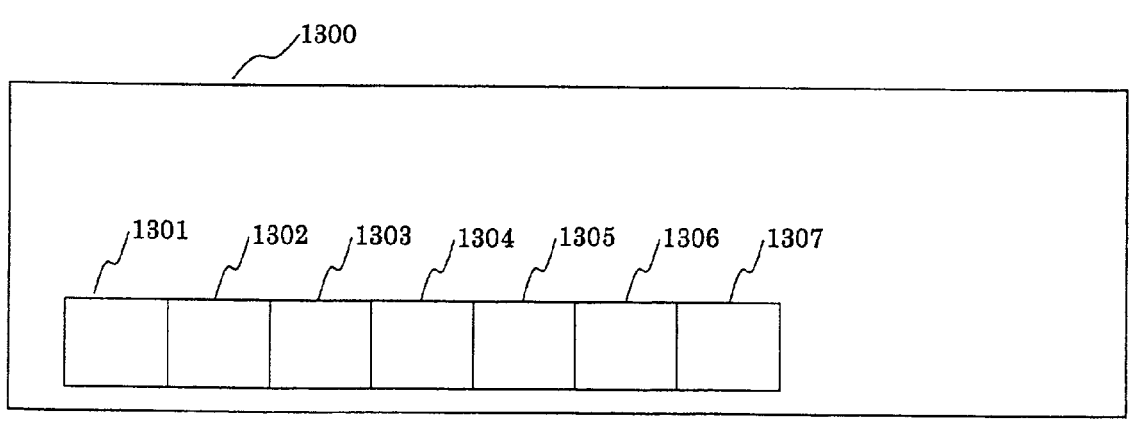
FIG. 5 is a typical structure of an area for storing a language unit in which a first language is Japanese and a second language is Indonesian in the database of this multilingual conversation assist system.

Referring to FIG. 5, description will be about a typical structure of the area 1300 for storing a language unit on the assumption that the first language is Japanese and the second language is Indonesian. The area 1300 can be formed, for example, by the use of a relational database query. As original tables, use is made of the basic table 100, the Japanese language table 200, and the Indonesian language table 600. Each query is virtually formed by combining fields of the original tables. Reference numerals 1301, 1302, 1303, 1304, 1305, 1306, and 1307 designate the word identification number field 101 of the basic table 100, the image display file name field 102 of the basic table 100, the conception field 103 of the basic table 100, the Japanese character display field 202 of the Japanese language table 200, the Indonesian character display field 602 of the Indonesian language table 600, the Indonesian voice field 603 of the Indonesian language table 600, and the Japanese phonetic expression field 604 for representing the Indonesian pronunciation of the Indonesian language table 600 in Japanese, respectively.

Figure 6:
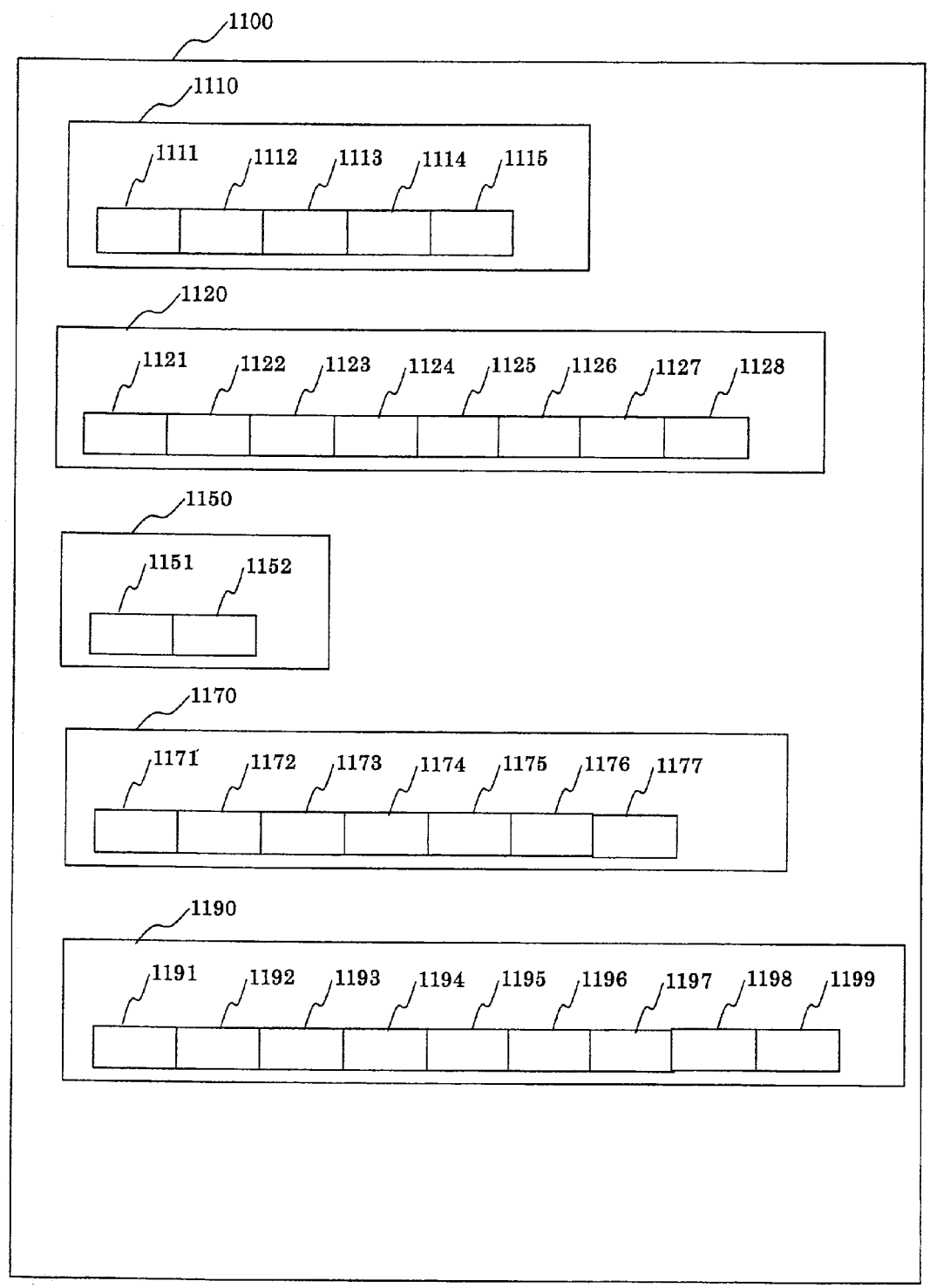
FIG. 6 is a typical structure of an area for storing data for setting a conversational situation in the database of this multilingual conversation assist system.

Referring to FIG. 6, description will be given about a typical structure of the area 1100 for storing data for setting a conversational situation. The area 1100 can be formed, for example, by the use of a plurality of tables and queries of a relational database. A scene selection table 1110 is for storing data for displaying first-stage options when a conversational situation is set. It is assumed that the first language and the second language have already been determined and the following description is made as an example where the first language is Japanese and the second language is Indonesian. The scene selection table 1110 comprises a scene identification field 1111, a display sequence field 1112, a word identification number field 1113, a next-stage query identification field 1114, and a next-stage display type identification field 1115. The scene selection table 1110 has stored records specified by values corresponding to the respective fields. From FIG. 6, illustration of individual records is omitted. An example of individual records is shown in FIG. 7.

Referring to FIG. 7, an example of the scene selection table 1110 will be described below. In FIG. 7, the illustrated record 1141 has a value "101" in the scene identification field 1111 and a value "1" in the display sequence field 1112, which means that arrangement is made at a first one of options. A value "14" is set to the word identification number field 1113 and is used as the external key, corresponding to the word identification number field 101 which is operable as the primary key of the basic table 100. A value "2" is set to the next-stage table identification field 1114 and indicates a table number at which data of an option in the next-stage is stored. A value "10" is set to the next-stage display type identification field 1115 so as to display the next-stage option data in a display format corresponding to "10". Similarly, illustration is made about a record 1142 that defines data related to a second option displayed on scene selection, a record 1143 that defines data related to a third option displayed on the scene selection, and the a record 1144 that defines data related to a fourth option displayed on the scene selection.

Referring to FIG. 8, there is shown an example of records of the basic table 100 corresponding to the example of the records on the scene selection table 1110 shown in FIG. 7. The illustrated record 111 has a value "14" in the word identification number field, a value "airport.gif" in the image display file name field 102, and a value "airport" in the conception field 103. The record 111 is associated with the record 1141 of the scene selection table 1110 through the word identification number that is used as a key. Similarly, records 112, 113, and 114 are associated with the records 1142, 1143, and 1144 of the scene selection table 1110, respectively, through the word identification number fields of these tables that are used as keys.

Referring to FIG. 9, there are exemplified the records in the Japanese language table 200, which correspond to the records in the scene selection table 1110 shown in FIG. 7. The illustrated record 211 has a value "14" in the word identification number field 201, which is operable as the external key and which corresponds to the word identification number field 101 operable as the primary key of the basic table 100. In the Japanese character display field 202, "airport_jpn_c.gif," is held as a value so as to indicate that Japanese characters "空港" are stored in a GIF format file as an image to be displayed as one of the options.

The area 1100 shown in FIG. 6 includes a scene selection query 1120. The query 1120 is structured by parts of fields of the basic table 100, the scene selection table 1110, and the Japanese language table 200. Specifically, it is formed by the word identification number field 1121, the image display file name field 1122 of the basic table 100, the scene identification field 1123, the display sequence field 1124, the next-stage query identification field 1125, and the next-stage display type identification field 1126 of the scene selection table 1110, and the Japanese character display field 1127 of the Japanese language table 200. Although records are included in each query 1120, they are omitted from FIG. 6.

Referring to FIG. 10, records of the query 1120 will be exemplified by referring to FIGS. 7, 8, and 9 together. FIG. 10 exemplifies a query 1120 combined by using the word identification number fields of the tables shown in FIGS. 7, 8, and 9 as keys. In FIG. 10, there are shown four records 1131, 1132, 1133, and 1134 associated with values "14," "15," "16," and "17" of the word identification number field.

Figure 11:
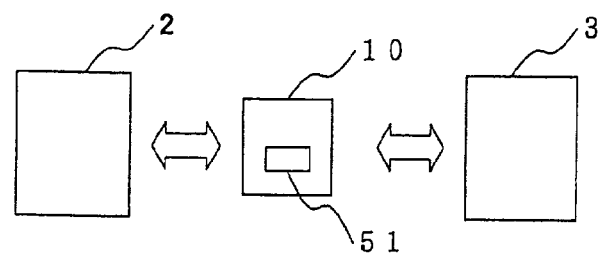
FIG. 11 is a diagram showing a relation among a user understanding the first language, a user understanding the second language, and an electronic display unit in this multilingual conversation assist system.

Referring to FIG. 11, there is shown a case where a first user 2 who understands Japanese as the first language presents or shows an information display terminal 10 to a second user 3 who understands Indonesian as the second language. In this situation, a conversation is carried out by effectively making use of multimedia with icons or the like sequentially displayed on an information display section 51 of the information display terminal 10.

Figure 12:
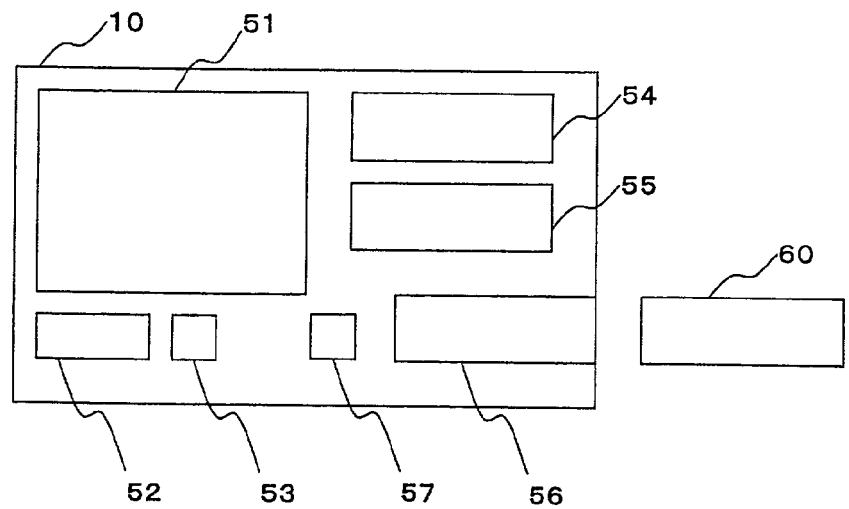
FIG. 12 is a diagram showing a typical configuration of an information display terminal of this multilingual conversation assist system.

Referring to FIG. 12, the information display terminal 10 will be described below. The illustrated information display terminal 10 has the information display section 51, a cursor control section 52, and a selection button 53, with a main control section 54 controlling the information display terminal 10 in cooperation with a program stored in a main memory section 55. In addition, a removable memory holding section 56 can detachably hold a removable memory 60. In FIG. 12, the information display terminal 10 may be a communication device or a portable device, such as a notebook-sized personal computer, a desktop personal computer, a PDA, a mobile telephone, a TV set, a game machine, or the like. In addition, the removable memory 60 may be a storage device or a storage medium such as a floppy (registered trademark) disk, an optical magnetic disk (MO), a CD-ROM, a CD-R, a DVD, a memory stick, a CompactFlash (registered trademark), a memory, a smart media, or the like.

Figure 13:
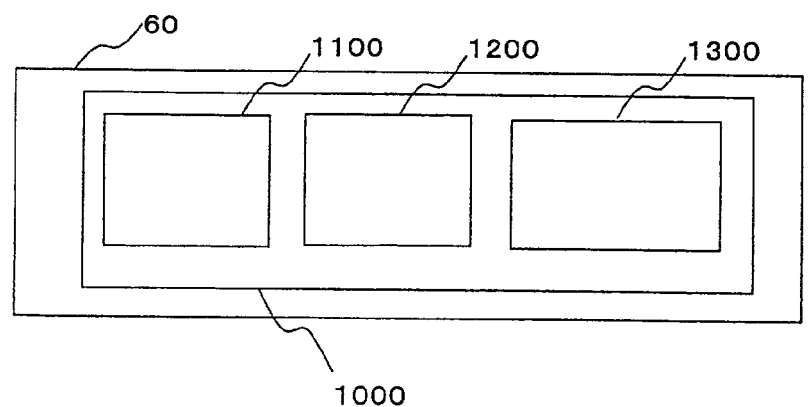
FIG. 13 is a diagram showing a typical configuration of a removable memory of this multilingual conversation assist system.

Referring to FIG. 13, there is shown an example of the removable memory 60. The illustrated removable memory 60 stores all of the database 1 or, for example, the subdatabase 1000 limited to a conversation assist between Japanese as the first language and Indonesian as the second language. The latter is referred to as a Japanese-to-Indonesian conversation assist package. The subdatabase 1000, in the same manner as for FIG. 1, includes the area 1100 for storing data for setting the conversational situation, the control section 1200 for storing a control program by reading, from the area 1100, data for making the user set a conversation situation to display the same, and the area 1300 for storing language units which are used when the first language is Japanese and the second language is Indonesian.

Figure 14:
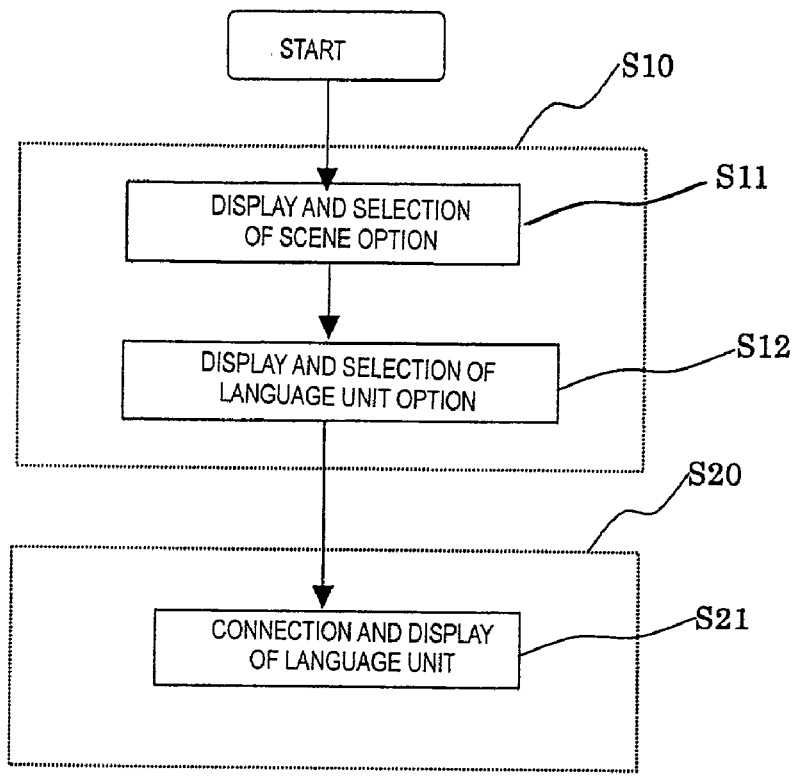
FIG. 14 is a diagram showing an embodiment of an execution process of a conversation assist of this multilingual conversation assist system.

Referring to FIG. 14, there is shown a flow chart illustrating an embodiment of an execution process of a conversation assist.

Referring to FIG. 14 together with FIGS. 15 and 12, description will be made about an operation executed on the assumption that the removable memory 60, which stores the Japanese-to-Indonesian conversation assist package 1000, is inserted into the removable memory holding section 56 and then the operation is started. In this condition, a scene selection menu 70 is displayed on the information display section 51 shown in FIG. 15, in order to execute step S11 as the first step "DISPLAY AND SELECTION OF SCENE OPTION" included in step S10 and to set a conversational situation under control of the control section 1200. In the illustrated example, the first language is Japanese and therefore the scene selection menu 70 is displayed in Japanese. The control section 1200 reads, as the first step, the scene selection query 1120 out of the area 1100 for storing data and sets the conversational situation. Records 1131, 1132, 1133, and 1134 shown in FIG. 10 are sequentially read and a display sequence of the scene options is determined on the basis of a value of the display sequence field 1124 of the scene selection table of the records. As a result, data of the record 1131 having a value "1" in the scene selection table display sequence field 1124 is displayed as the first option, and then data of the record 1132 is displayed as the second option. Likewise, data of the record 1133 is displayed as the third option, and data of the record 1134 is displayed as the fourth option finally. An image file "airort_jpn_c.gif" of the Japanese language table Japanese character display field 1127 of the record 1131 is displayed at a position 71 in the selection menu 70. An image file "airport.gif" of the basic table image display file name field 1122 of the record 1131 is displayed at a position 72. Subsequently in the same manner, there are displayed an image file of the field 1127 of the record 1132 at position 73, an image file of its field 1122 at position 74, an image file of the field 1127 of the record 1133 at position 75, an image file of its field 1122 at position 76, an image file of the field 1127 of the record 1134 at position 77, and an image file of its field 1122 at position 78. The image file 71 is used together with a character code in order to display the characters "空港" as a scene option so as to cope with general uses such as Hankul script or Thai characters display. Additionally, the image display file 72 is used besides the character expression 71, such as "空港", and is displayed as the scene option. This visually facilitates a decision on the menu selection by the help of an image expression as well as the character display.

Figure 15:
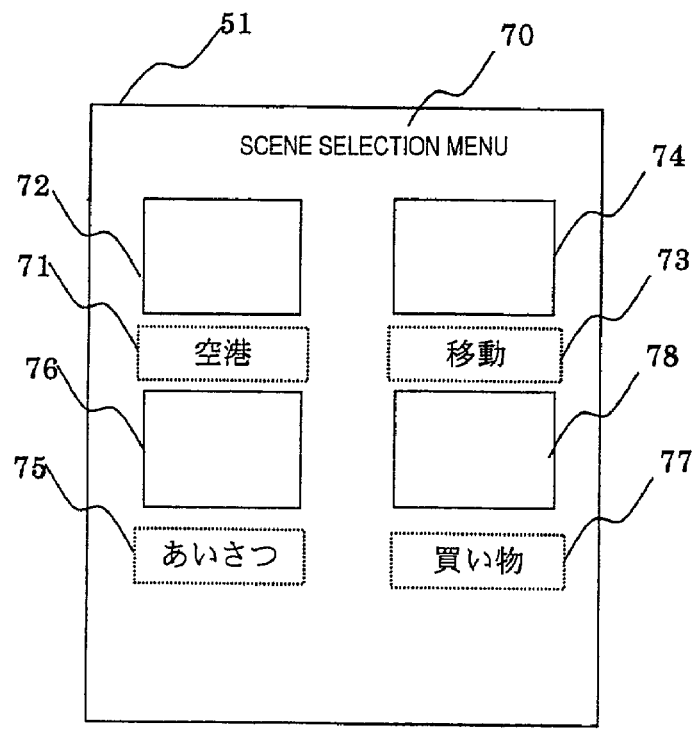
FIG. 15 is a diagram showing a typical display of a scene selection menu of this multilingual conversation assist system.

In FIG. 15, the image file 71 or the image file 72 is clicked, for example, to select an option of the scene "空港" on the scene selection menu 70. To select other options, the image files 72 to 78 may be clicked in the same manner.

For example, when the image file 72 in FIG. 15 corresponding to the first option in FIG. 15 is clicked, this shows that the record 1131 is selected as the first record in the records stored in the scene selection query. The scene selection control section 1200 reads a value "101" of the scene selection table scene identification field 1123 of the selected record 1131 and sets the selected scene to "101." Since the selected record 1131 has the word identification number "14" on the basic table, it is understood from the basic table 100 in FIG. 8 that the value of the corresponding conception field 103 is indicative of "airport". In other words, it is understood that the scene "airport" is set as the first step for setting a conversational situation.

Figures 16, 17:
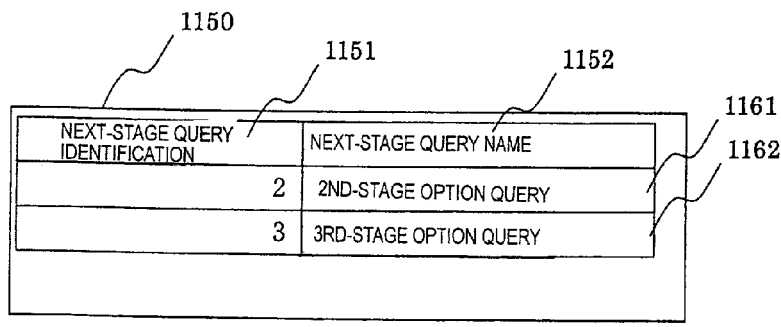
FIG. 16 is a diagram showing a typical structure of a next-stage query identification table in the database of this multilingual conversation assist system.
FIG. 17 is a diagram showing an example of records included in a second-stage option table in the database of this multilingual conversation assist system.

Referring to FIG. 16, a next-stage query identification table 1150 will be described below. Since the record 1131 selected in FIG. 10 has a value "2" of the scene selection table next-stage query identification field 1125, an option in the next-stage is displayed by using data stored in the next-stage query identification table 1150 shown in FIG. 16. The next-stage query identification table 1150 is included in the area 1100 for storing data for setting the conversational situation in FIG. 6. The next-stage query identification table 1150 has the next-stage query identification field 1151 and the next-stage query name field 1152.

In FIG. 16, there are shown a record 1161 and a record 1162 as concrete examples of records. On the next-stage query identification table 1150, the next-stage query name of the record 1161 having a value "2" in the next-stage query identification field 1151 is "the second-stage option query" and the option for the next stage is displayed using data of the second-stage option query 1190 shown in FIG. 18.

The area 1100 shown in FIG. 6 includes the second-stage option table 1170. The illustrated second-stage option table 1170 comprises a scene identification field 1171, a language unit identification field 1172, a display sequence field 1173, a word identification number 1174, a language unit connection field 1175, a next-stage query identification field 1176, and a next-stage display type identification field 1177 as shown in FIG. 17. While the second-stage option table 1170 includes records, a description of the records is omitted from FIG. 6.

Referring to FIG. 17, there is shown an example of records 1181 to 1184 included in the second-stage option table 1170.

The area 1100 illustrated in FIG. 6 includes the second-stage option query 1190. The second-stage option query 1190 comprises a scene identification field 1191 of a second-stage option table, a language unit identification field 1192 of the second-stage option table, a display sequence field 1193 of the second-stage option table, a basic table word identification number field 1194, a basic table image display file name field 1195, a language unit connection field 1196 of the second-stage option table, a next-stage query identification field 1197 of the second-stage option table, a next-stage display type identification field 1198 of the second-stage option table, and a Japanese language table Japanese character display field 1199. While the second-stage option query 1190 includes records, a description of the records is omitted in FIG. 6.

Figure 18:
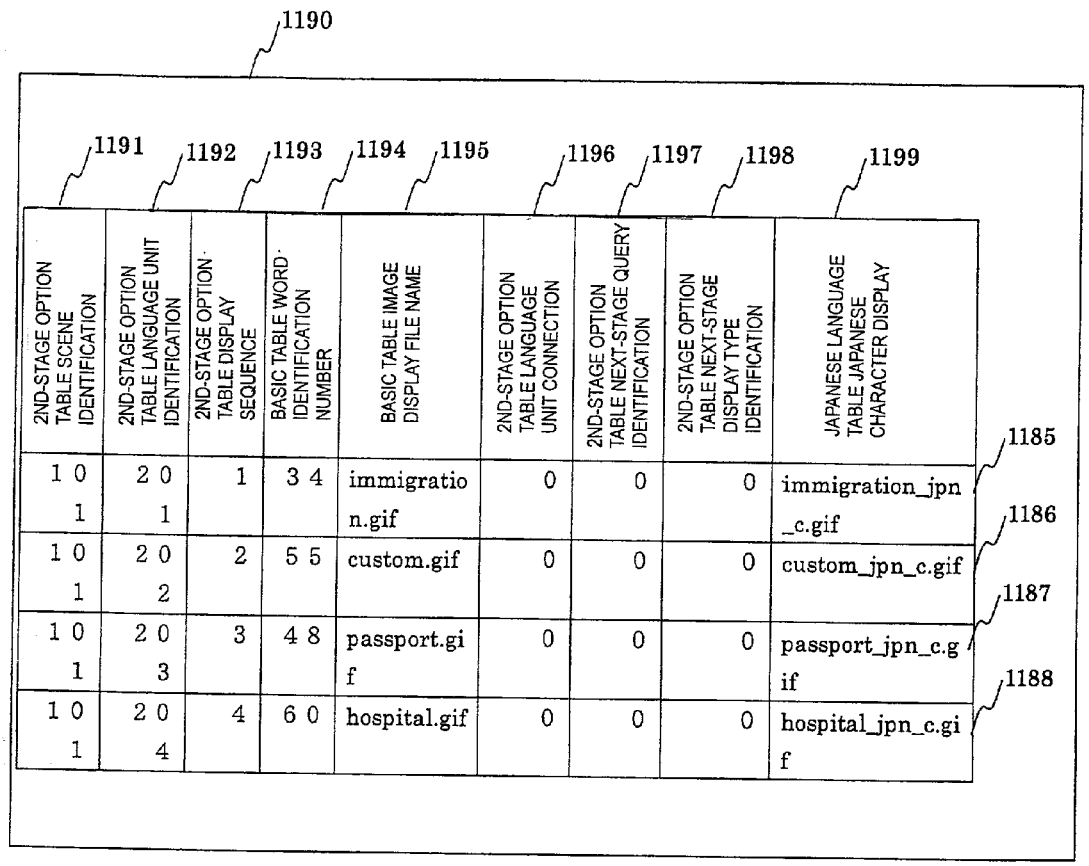
FIG. 18 is a diagram showing an example of records included in the second-stage option query in the database of this multilingual conversation assist system.

Referring to FIG. 18, there is shown an example of records 1185 to 1188 included in the second-stage option query 1190.

Figure 19:
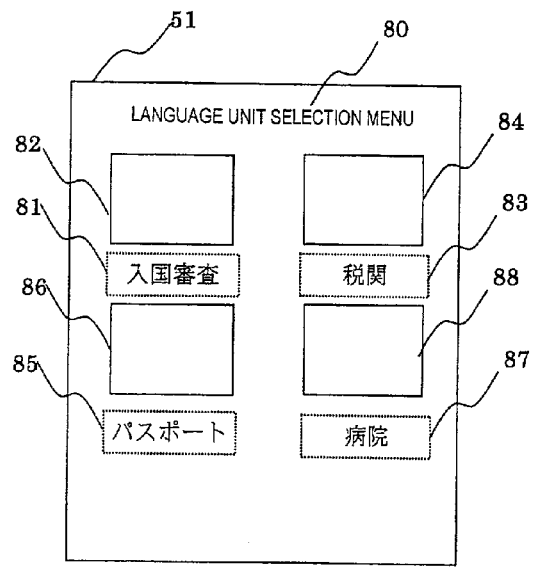
FIG. 19 is a diagram showing a typical display of a language unit selection menu of this multilingual conversation assist system.

Referring to FIG. 19 along with FIGS. 14, 15, and 18, description will be made about an operation executed when the image 72 is clicked in the step 11 of "DISPLAY AND SELECTION OF SCENE OPTION". If "空港" is selected in the scene selection menu 70 in this condition, the operation is shifted to step S12 of "DISPLAY AND SELECTION OF LANGUAGE UNIT OPTION" illustrated in FIG. 14. The control section 1200 reads data of the second-stage option query 1190 from both the scene selection query 1120 and the next-stage query identification table 1150 and determines a display item as an option of a language unit. For the option of the read language unit, the value "10" is read from the scene selection table next-stage display type identification field 1126 of the selected record 1131 of the scene selection query 1120 and the corresponding language unit option display type is determined, and a language unit option is displayed, for example, in a layout shown in FIG. 19. In the second-stage option query 1190, a record is selected and read out only when a value of the second-stage option table scene identification field 1191 is equal to "101" which is equal to the value of the scene identification field 1123 selected in the previous step S11.

In the example shown in FIG. 18, records 1185 to 1188 are read out. In FIG. 18, a value of the second stage option table display sequence field 1193 indicates a display sequence or order of the selected language unit option and the records 1185, 1186, 1187, and 1188 are displayed in this order in an example of FIG. 18. As a result, image files shown in the Japanese language table Japanese character display field 1198 in FIG. 18 are sequentially displayed at positions 81, 83, 85, and 87 in the language unit selection menu 80 shown in FIG. 19. In the same manner, image files shown in a basic table image file name field 1195 shown in FIG. 18 are sequentially displayed at positions 82, 84, 86, and 88 shown in FIG. 19. In this manner, the display of the language unit option is completed.

In FIG. 19, to select an option of a scene "病院" in the language unit selection menu 80, either the corresponding image file 87 or the image file 88 is clicked. Other language unit options are selected in the same manner.

In FIG. 19, for example, clicking the image file 87 corresponding to the fourth option brings about selecting a record 1188 in the second-stage option query 1190. The control section 1200 reads "204" as a language unit identification from the value of the second-stage option table language unit identification field 1192 of the selected record 1188 and reads "60" as a word identification number from the basic table word identification number field 1194. Because of the value "0" of the next-stage query identification on the second-stage option table, operation is not moved to the step 12 of "DISPLAY AND SELECTION OF LANGUAGE UNIT OPTION" as the next step, but the step S10 of setting the conversational situation is terminated in FIG. 14 and is then moved to the "CONNECTION AND DISPLAY OF LANGUAGE UNIT" step 21 in the language unit display step 20. Because of a value "0" of the second-stage option table language unit connection field 1196, it is determined that a language unit connection is unnecessary.

Figure 20:
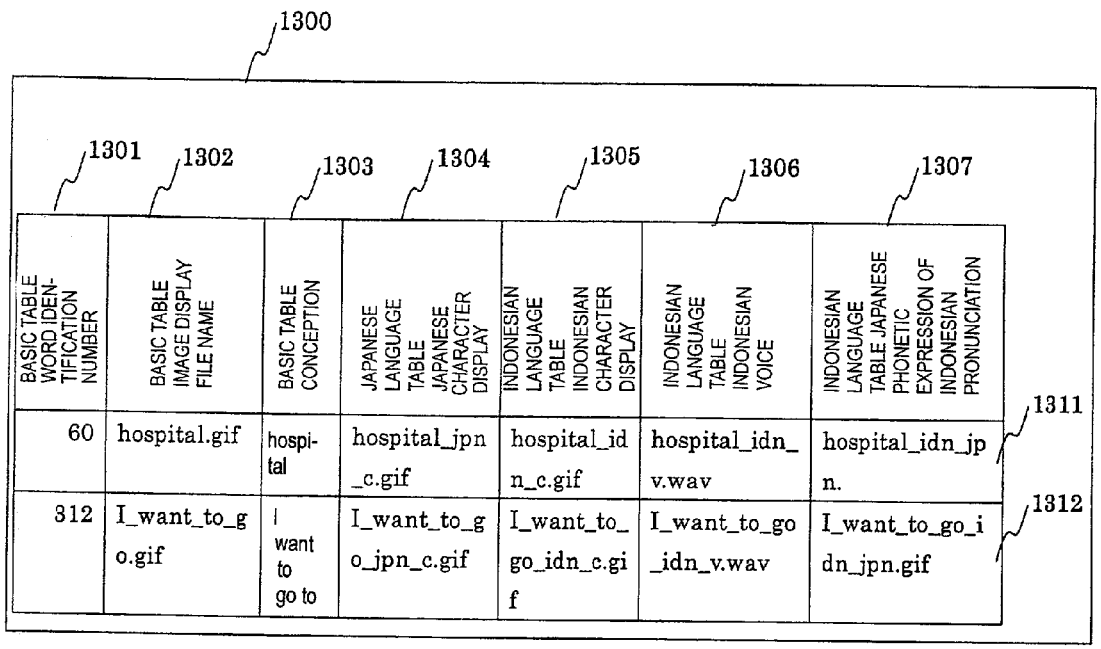
FIG. 20 is a diagram showing an example of records in an area for storing a language unit in which the first language is Japanese and the second language is Indonesian in the database of this multilingual conversation assist system.
Figure 21:
FIG. 21 is a diagram showing a typical display of a language unit of this multilingual conversation assist system.

Referring to FIG. 20 and FIG. 21, an operation will be described below by taking an example where the selected record 1188 has a value "60" of the basic table word identification number field 1194. In this case, the control section 1200 searches for a record having the same value "60" of the basic table word identification number field 1301 from the query shown as the area 1300 in FIG. 5 to acquire a record 1311 shown in FIG. 20. An image file name "hospital.gif" is read from a value of the basic table image display file name field 1302 of the record 1311 and then the image file "hospital.gif" is displayed at a position 251 as part of the language unit display area 250 in the information display section 51 shown in FIG. 21. Subsequently, an image file name "hospital_jpn_c.gif" is read in a similar manner from the Japanese language table Japanese character display field 1304 of the record 1311, the image file "hospital_jpn_c.gif" is displayed at a position 252, an image file name "hospital_idn_c.gif" is read from the Indonesian language table Indonesian character display field 1305, the image file "hospital_idn_c.gif" is displayed at a position 253, an image file name "hospital_idn_jpn.gif" is read from the Indonesian language table Indonesian pronunciation Japanese phonetic expression field 1307 (namely, Japanese phonetic expression field of Indonesian pronunciation in the Indonesian language table), and the image file "hospital_idn_jpn.gif" is displayed at a position 254, thereby acquiring a display screen as shown in FIG. 21. Furthermore, if a voice file name "hospital_idn_v.wav" is read from the Indonesian language table Indonesian voice field 1306 of the record 1311, for example, a hyper link 255 is set at a position 254 for a phonetic expression, and the hyper link at the position 254 is clicked, the voice file "hospital_idn_v.wav" is started. Thus, an output is made about an Indonesian voice "rumah sakit" meaning "hospital" which is representative of a conception of the language unit from the voice output section 57 shown in FIG. 12. As set forth in the above, in the "CONNECTION AND DISPLAY OF LANGUAGE UNIT" step S21, the language unit 250 is displayed by effectively making use of multimedia, such as the character display 253, the image expression 251, the phonetic expression 254, and the voice output 255. Thus, a conversation between Japanese and Indonesian is effectively assisted.

A description will be made below about a second embodiment related to the "DISPLAY AND SELECTION OF LANGUAGE UNIT OPTION" shown in FIG. 14.

Referring to FIGS. 22 and 15, the control section 1200 uses a scene selection query 1120 shown in FIG. 22 on displaying the scene selection menu 70 shown in FIG. 15. When clicking is executed on the character display 71 in the scene selection menu 70, the control section 1200 refers to a record 1135 having a value "1" for the scene selection table display sequence field 1124 in the scene selection query 1120 in FIG. 22. Recognizing a value "101" of the scene identification, a value "2" of the next-stage query identification, and a value "20" of the next-stage display type identification from data of the record 1135, the control section searches for a next-stage query name 1152 having a value "2" for the next-stage query identification from the next-stage query identification table 1150 in FIG. 16 and then reads that it is "the second-stage option query" of the record 1161.

Referring to FIG. 23, the control section 1200 searches for a record having the value "101" of the second-stage option table scene identification field 1191 from the second-stage option query 1190 and acquires records 1211, 1212, 1213, and 1214. In the same manner as for FIG. 15, the control section 1200 displays the same language unit selection menu 80 as in FIG. 19 in the information display section 51, first, on the basis of the next-stage display type as indicated by the next-stage display type identification "30."

Referring to FIGS. 23, 19 a description will be made below by taking an example that the fourth option "hospital" is selected, for example, by clicking on the character display 87 of the hospital on the language unit selection menu 80. The control section 1200 searches for a record having a value "4" of the second-stage option table display sequence field 1193 from the second-stage option query 1190, reads the record 1214, recognizes the value "304" of the language unit identification field 1192, "1" of the language unit connection field 1196 that defines "ON" of the language unit connection. In addition, the control section 1200 also recognizes the value "3" of the next-stage query identification field 1197. The value "3" of the field 1197 shows that an option screen in the third-stage conversational situation should be displayed by using "the third-stage option query" from the next-stage query identification table 1150. Moreover, it is recognized that the value of the next-stage display type field 1198 is equal to "30" .

Referring to FIG. 24, there is shown an example of a structure of the third-stage option table 1220 and the third-stage option query 1240 included in the area 1100 for storing data for setting a conversational situation. The third-stage option table 1220 comprises a previous-stage language unit identification field 1221, a language unit identification field 1222, a display sequence field 1223, a word identification number 1224, a language unit connection field 1225, a next-stage query identification field 1226, and a next-stage display type identification field 1227. While the second-stage option table 1220 includes records, a description of the records is omitted in FIG. 25. The area 1100 for storing data for setting the conversational situation comprises a portion shown in FIG. 6 and a portion shown in FIG. 24.

The third-stage option query 1240 comprises a third-stage option table previous-stage language unit identification field 1241, a third-stage option table language unit identification field 1242, a third-stage option table display sequence field 1243, a basic table word identification number field 1244, a basic table image display file name field 1245, a third-stage option table language unit connection field 1246, a third-stage option table next-stage query identification field 1247, a third-stage option table next-stage display type identification field 1248, and a Japanese language table Japanese character display field 1249. While the third-stage option query 1240 includes records, a description of the records is omitted from FIG. 24.

Referring to FIG. 25, there is shown an example of records 1251 and 1252 included in the third-stage option query 1240.

Figure 26:
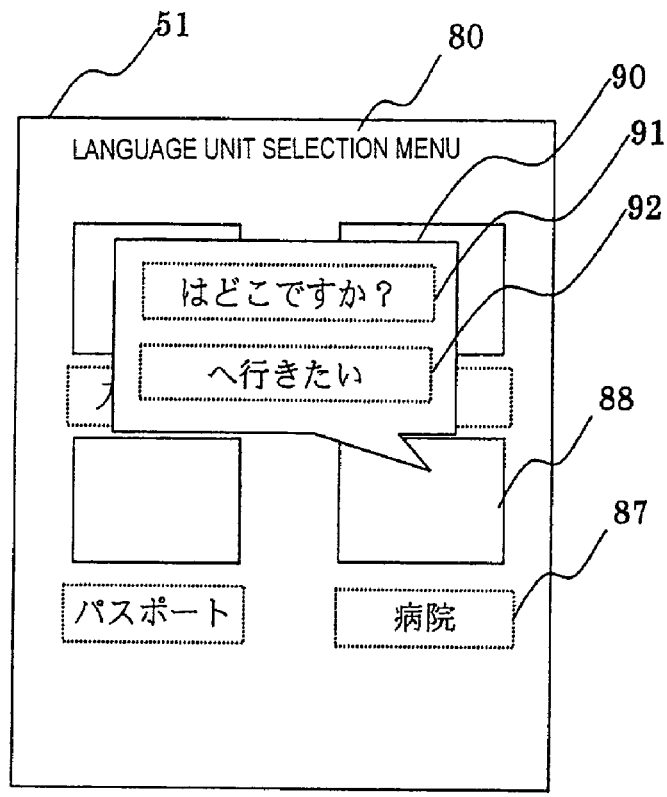
FIG. 26 is a diagram showing a second typical display of the language unit selection menu of this multilingual conversation assist system.

Referring to FIG. 26, the control section 1200 searches for a record having value "304" of the third-stage option table previous-stage language unit field 1241 from the third-stage option query 1240, and acquires the records 1251 and 1252. Thus, the control section 1200 recognizes that data of the record 1251 should be displayed as a first option in the third-stage options and that data of the record 1252 should be displayed as a second option in the third stage options due to values "1" and "2" of the display sequence field 1243, respectivley, displays a pop-up menu 90 shown in FIG. 26 on the basis of a value "30" of the next-stage display type field of the record 1251, displays a file "where_is_jpn_c.gif" read from the Japanese character display field 1249 in the record 1251 as a first menu of the third stage at a position 91 in the pop-up menu 90, and displays a file "I_want_to_go_jpn_c.gif" read from the Japanese character display field 1249 in the record 1252 as a second menu of the third stage at a position 92. Thereby, the menu display of the third stage is acquired which includes two options "はどこですか?" and "へ行きたい" of Japanese expressions as the first language shown in FIG. 26.

Figure 27:
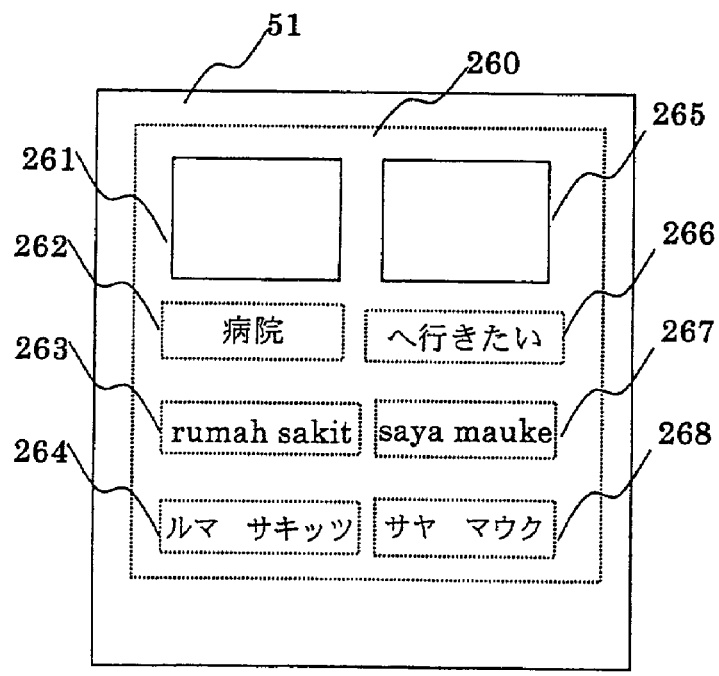
FIG. 27 is a diagram showing a second example of the language unit display of this multilingual conversation assist system.

Referring to FIG. 27, there is shown a second embodiment of the "CONNECTION AND DISPLAY OF LANGUAGE UNIT" step S21 in FIG. 14. In FIG. 26, if an option "へ行きたい" at the position 92 is clicked as a third-stage option for a selection, the control section 1200 proceeds to processing on the basis of data of the record 1252 corresponding to the second display sequence in the third-stage option query, recognizes that there is no fourth-stage option display due to a value "0" of the next-stage query identification field 1247 of the record 1252, and shifts to a display of a language unit. Since "1" is set to the value of the language unit connection field of the record 1214, the language unit "病院" selected as the second-stage option in FIG. 19 is connected with the language unit "へ行きたい" selected as the third-stage option in FIG. 26 to display it as a new language unit. Specifically, since "60" is set to the value of the word identification number field 1194 of the record 1214 and "312" is set to the value of the word identification number field 1244 of the record 1252, the control section 1200 searches for a record having the same "60" and "312" values of the basic table word identification number field 1301 with these values as keys from the query shown as the area 1300 for storing a language unit in which the first language is Japanese and the second language is Indonesian in FIG. 5 and acquires the records 1311 and 1312 shown in FIG. 20. An image file name "hospital.gif" is read from the value of the basic table image display file name field 1302 of the record 1311 and then the image file "hospital.gif" is displayed at a position 261 as part of a language unit display area 260 in the information display section 51 shown in FIG. 27. Subsequently in the same manner, an image file name "hospital_jpn_c.gif" is read from the Japanese language table Japanese character display field 1304 of the record 1311, the image file "hospital_jpn_c.gif" is displayed at a position 262, an image file name "hospital_idn_c.gif" is read from the Indonesian language table Indonesian character display field 1305, the image file "hospital_idn_c.gif" is displayed at a position 263, an image file name "hospital_idn_jpn.gif" is read from the Indonesian language table Indonesian voice Japanese phonetic expression field 1307, and the image file "hospital_idn_jpn.gif" is displayed at a position 264. Furthermore, for a connection and a display of two language units, an image file name "I_want_to_go.gif" is read from the value of the basic table image display file name field 1302 of the record 1312 and the image file "I_want_to_go-gif" is displayed at a position 265 as part of the language unit display area 260 in the information display section 51 in FIG. 27. Subsequently in the same manner, an image file name "I_want_to_go_jpn_c.gif" is read from the Japanese language table Japanese character display field 1304 of the record 1312. Thus, the image file "I_want_to_go_jpn_c.gif" is displayed at a position 266 and the image file name "I_want_to_go_idn_c.gif" from the Indonesian language table Indonesian character display field 1305. As a result, the image file As a result, the image file "hospital_idn_c.gif" is displayed at position 263. Specifically, the image file name "I_want_to_go_id_njpn.gif" is read from the Indonesian language table Indonesian voice Japanese phonetic expression filed 1307, and the image file "I_want_to_go_idn_jpn.gif" is displayed at a position 267, and thereby a display screen shown in FIG. 27 is acquired. Furthermore, voice file names "hospital_idn_v.wav" and "I_want_to_go_idn_v.wav" are read from the Indonesian language table Indonesian voice field 1306 of the records 1311 and 1312. For example, a click on the language unit display area 260 starts the voice file "hospital_idn_v.wav" first and subsequently starts the voice file "I_want_to_go_idn_v.wav", thereby outputting an Indonesian voice "rumah sakit" of "hospital" which is a conception of the language unit from the voice output section 57 in FIG. 12 and subsequently an Indonesian voice "saya mauke" of "I want to go" which is a conception of the language unit. As set forth hereinabove, in the second embodiment of the "CONNECTION AND DISPLAY OF LANGUAGE UNIT" step S21, two language units are connected or concatenated with each other. In this event, the language unit display area 260 includes the character displays 263 and 267, the image displays 261 and 265, the phonetic expressions 264 and 268, and the voice outputs are shown by effectively making use of the multimedia and, thereby, a conversation between Japanese and Indonesian is effectively assisted.

A description is made below for a third embodiment of the "DISPLAY AND SELECTION OF LANGUAGE UNIT OPTION" step S12 shown in FIG. 14.

Referring to FIG. 22 together, if the character display 71 is clicked in the scene selection menu 70, the control section 1200 refers to the record 1135 having a value "1" of the scene selection table display sequence field 1120 in the scene selection query 1120 in FIG. 22. The control section 1200 recognizes a value "101" in the scene identification, a value "2" in the next-stage query identification and "20" in the next-stage display type identification. In addition, the control section 1200 searches for a next-stage query name field 1152 having the value "2" for the next-stage query identification field from the next-stage query identification table 1150 in FIG. 16, and reads that it is "the second-stage option query" of the record 1161.

FIG. 28 shows a third embodiment of the "second-stage option query."

Referring to FIG. 28, the control section 1200 searches for a record having the "101" value in the second-stage option table scene identification field 1191 from the second-stage option query 1190 in the same manner as in FIG. 23, acquires records 1215, 1216, 1217, and 1218, and displays the same language selection menu 80 as in FIG. 19 on the information display section 51. Furthermore, if the character display 87 of a hospital, for example, is clicked to select "hospital" which is the fourth option in the language unit selection menu 80, the control section 1200 searches for a record having a value "4" of the second-stage option table display sequence field 1193 from the second-stage option query 1190, reads the record 1218, recognizes "304" for a value of the language unit identification field 1192, "1" for the language unit connection field 1196, and "ON" for the connection of the language units, recognizes "3" for a value of the next-stage query identification field 1197 and that an option screen for the third-stage conversational situation should be displayed by using "the third-stage option query" from the next-stage query identification table 1150, recognizes "30" for a value of the next-stage display type field 1198, and recognizes "0," namely, "object" for a value of a sentence element field 1201.

Figure 29:
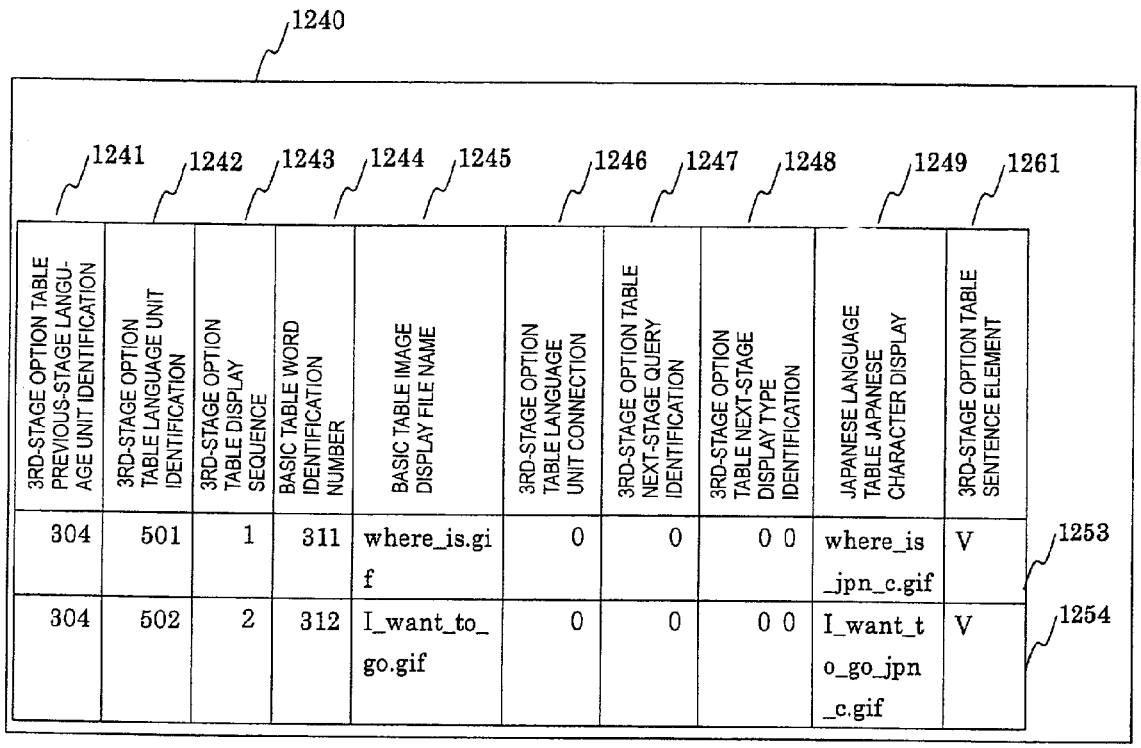
FIG. 29 is a diagram showing a second embodiment of records included in the third-stage option query of this multilingual conversation assist system.

Referring to FIG. 29, there are shown records 1253 and 1254 as a second example of records included in the third-stage option query 1240. In comparison with the second example shown in FIG. 25, a sentence element field on the third-stage option table 1261 is added anew.

Referring to FIG. 26, the control section 1200 searches for a record having a value "304" of the third-stage option table previous-stage language unit field 1241 from the third-stage option query 1240, acquires the records 1253 and 1254, and displays the pop-up menu 90 shown in FIG. 26.

Figure 30:
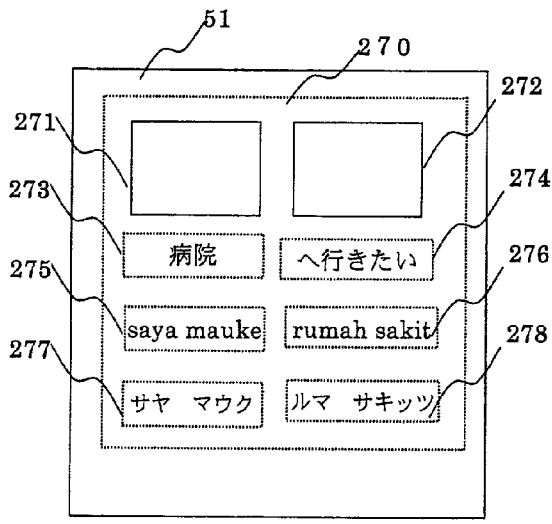
FIG. 30 is a diagram showing a third example of the language unit display of this multilingual conversation assist system.

There is shown a third embodiment of the "CONNECTION AND DISPLAY OF LANGUAGE UNIT" STEP S21 in FIG. 14 by referring to FIG. 30.

If the option "へ行きたい" at the position 92 is clicked as the third-stage option for a selection in FIG. 26, the control section 1200 advances processing on the basis of data of the record 1254 corresponding to the second of the display sequence in the third option query 1240 in FIG. 29, recognizes that there is no fourth-stage option display due to a value "0" of the next-stage query identification field 1247 of the record 1254, and then shifts to a display of the language units. Due to a value "1" of the language unit connection field of the record 1214, the language unit "病院" selected as the second-stage option in FIG. 19 is connected with the language unit "へ行きたい" selected as the third-stage option in FIG. 26 and it is displayed as a new language unit. Specifically, due to a value "60" of the word identification number field 1194 of the record 1218 and a value "312" of the word identification number field 1244 of the record 1254, with these values as keys, the control section 1200 searches for records having the same "60" and "312" values for the basic table word identification number field 1301 from the query shown as the area 1300 for storing a language unit in which the first language is Japanese and the second language is Indonesian in FIG. 5 and acquires the records 1311 and 1312 shown in FIG. 20. An image file name "hospital.gif" is read from the value of the basic table image display file name field 1302 of the record 1311, the image file "hospital.gif" is displayed at a position 271 as part of the language unit display area 270 in the information display section 51 shown in FIG. 30, an image file "I_want_to_go.gif" is displayed at a position 272 similarly, and an icon in the language unit 270 is displayed. Subsequently, an image file "hospital_jpn_c.gif" is displayed at a position 273 and an image file "I_want_to_go_jpn_c.gif" is displayed at a position 274, by which a Japanese language display is executed in the language unit 270.

Figure 31:
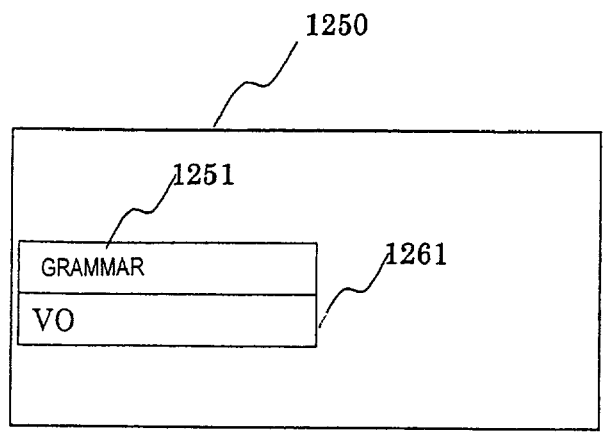
FIG. 31 is a diagram showing an Indonesian language grammar table of this multilingual conversation assist system.

Next, to display the Indonesian part of the language unit, the control section 1200 reads a value "0" for the sentence element field 1201 of the record 1218 and a value "V" of the sentence element field 1261 of the record 1254, searches for a record 1261 in which only two characters "V" and "0" are included in a grammar field 1251 on the Indonesian grammar table 1250 shown in FIG. 31, recognizes "V0" in a character unit sequence, and displays a character unit having the "V" sentence element first and then displays a character unit having the "0" sentence element. Specifically, by using data of the record 1218 and data of the record 1254 in FIG. 30, image files corresponding to positions 275, 276, 277, and 278 are displayed by executing the same processing as in FIG. 27, thereby acquiring a display shown in FIG. 30. It should be noted that the Indonesian grammar table 1250 is included in the area 1100.

Figure 32:
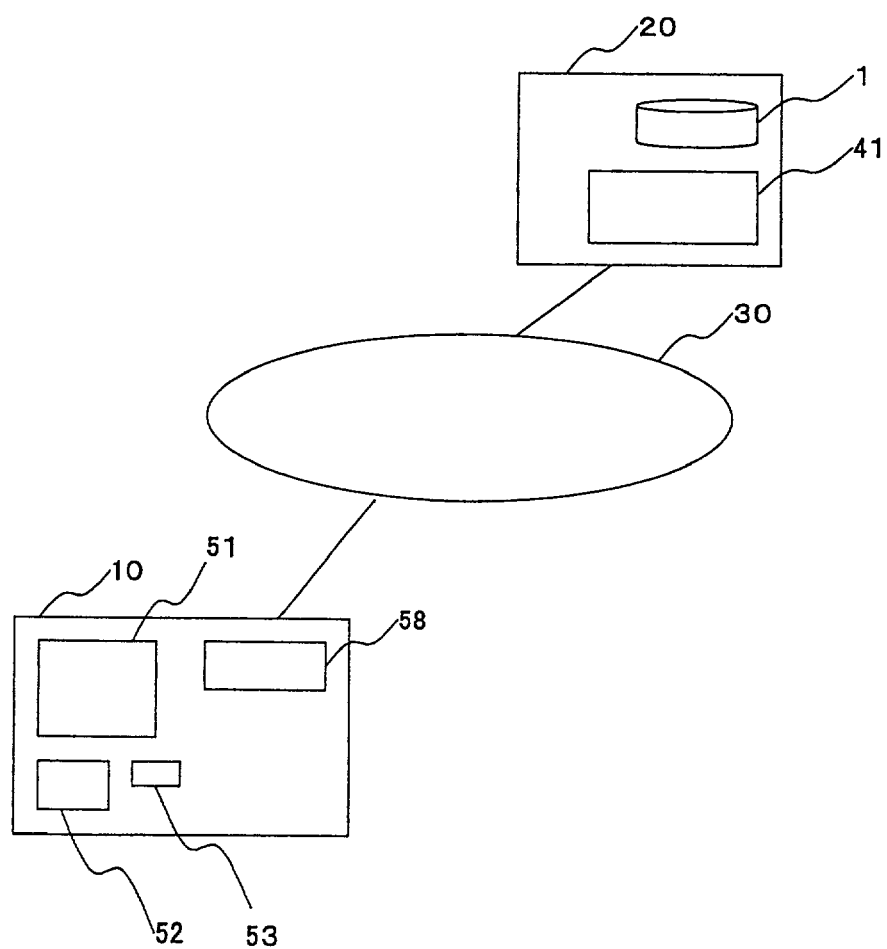
FIG. 32 is a diagram showing an embodiment wherein display is connected to server via a network of multilingual conversation assist system.

Referring to FIG. 32, the information display terminal 10 is connected to a server 20 via a network 30 as another embodiment of the conversation assist system. The server 20 has a database 1 for storing data for displaying a language unit and has a conversation assist service control section 41 for selecting language unit data specified by an instruction from the information display terminal 10 out of the database and transmitting it to the information display terminal 10. The information display terminal 10 displays a communication control section 58 which receives the language unit data from the server 20 via the network 30 and the received language unit 260 on the information display section 51.

In FIG. 32, the network can be the Internet, a mobile network, or a combination of the Internet and the mobile network. In FIG. 32, the information display terminal 10 can be a notebook-sized personal computer, a desktop personal computer, a PDA, a mobile telephone, a TV set, a game machine or the like.

The multilingual conversation assist system according to the present invention is capable of assisting or supporting a conversation easily between native speakers of the first and second different languages by displaying a language unit comprising icons, a second language phonetic symbol or a second language pronunciation output using an information display terminal.

The present multilingual conversation assist system is capable of assisting a conversation easily between various combinations of the first and second languages by replacing a conversation assist package stored in a removable memory with new one.

The present multilingual conversation assist system is may be connected to a server through a network and, in this event, is capable of assisting a conversation easily between various combinations of the first and second languages by selecting a language selection menu.

What is claimed is:

1. A multilingual conversation assist system for assisting a conversation between users of a plurality of languages, comprising:

a control means prompting a user to select a conversational situation; and a database comprising a single basic table, storing common conceptual information about at least two languages available for multilingual conversations, a plurality of tables, one table for each of said at least two languages storing language data for conversations in each language, and a plurality of subdatabases, one subdatabase for each of said at least two languages storing data available to a conversation, said single basic table being divided into a word identification number field, an image display file name field, and a conception field, a word identification number in said word identification number field being common among all of said at least two languages as long as a conception of a word is common, the word identification field serving to specify a primary key, each of said subdatabases including an area for storing data for setting a conversational situation, a control section for storing a control program for said control means for reading the setting data of the conversation situation and displaying language units corresponding to the selected conversation situation, and an area for storing language units that are used for said at least two languages, wherein displaying of a language unit is made effective using multimedia so as each language unit may be represented by a graphic image corresponding to a particular language unit, a language unit presented is in a first language, a phonetic expression of said language unit in second language, and voice output activation corresponding to the language unit presented in the second language.

2. The system according to claim 1, wherein said first means for setting the conversational situation displays predetermined options and has a structure of repeating a step of selecting one of said options a plural number of times.

3. The multilingual conversation assist system according to claim 2, wherein said options are displayed by using said language units stored in said subdatabase or a part thereof.

4. The system according to claim 2, wherein options over a plurality of stages for setting said conversational situation are stored in a first area of a subdatabase while said language units are stored in a second area of said subdatabase, and wherein one of said options is successively selected from said first area of said subdatabase to search and to display next-stage options in accordance with the selected option until one of final stage options is selected, and the language unit that corresponds to said selected option is searched from said second area of said subdatabase to be displayed.

5. The system according to claim 2, wherein a plurality of language units are selected in a step of selecting options in a plurality of stages and wherein said selected plurality of language units are combined together and displayed.

6. The system according to claim 5, wherein said selected plurality of language units are combined and displayed in compliance with a syntax rule previously stored in said second area of said subdatabase.

7. The system according to claim 1, wherein the language units corresponding to the set conversational situation are searched for in said subdatabase and displayed.

8. The system according to claim 7, further comprising a server storing said database.

9. The system according to claim 8, further comprising a communication device to which all or part of said database is downloaded by means of a communication with said server.

10. The system according to claim 7, further comprising a storage medium in which said database is previously stored.

11. The system according to claim 7, further comprising a portable device provided with a storage unit in which said database is previously stored.

12. The system according to claim 1, wherein said language unit includes a combination selected from any or all of a character expression in a first language, a character expression in a second language, a corresponding image display, a phonetic expression of a pronunciation in the second language with phonetic symbols in the first language, and a voice representation in the second language.

13. The system according to claim 1, wherein each said subdatabase contains an area for storing data for setting a conversational situation, said area including a second-stage option table and a second-stage query which includes a language unit connection field of the second-stage option table to indicate whether or not a next language unit is present.

14. A multilingual conversation assist system for assisting a conversation between users of a plurality of languages, comprising:

control means for prompting a user to select a conversational situation;

a database storing common conceptual information about at least two languages available for multilingual conversations, said database including a single basic table storing a common conception of language to each of the languages, said single basic table being divided into a word identification number field, an image display file name field, and a conception field, a word identification number in said word identification number field being common among all of said at least two languages as long as a conception of a word is common, the word identification field serving to specify a primary key, a plurality of tables for storing language data for conversations in each language, and a plurality of subdatabases for each pair of possible combination of languages available for multilingual conversation, each said subdatabase containing an area for storing data for setting a conversational situation, said area including a second-stage option table and a second-stage option query which includes a language unit connection field of the second-stage option table to indicate whether or not a next language is present; and display means for displaying language units corresponding to selected conversation situation, wherein said control means accesses said database and controls said display means to display each language unit as a graphic image corresponding to a particular language unit, a language unit presented in a first language, phonetic expression of said language unit is a second language, and voice output activation corresponding to the language unit in the second language.

15. The system according to claim 14, wherein said control means, in response to setting a conversational situation, controls said display means to display predetermined options.

16. The system according to claim 15, wherein said options are displayed by using said language units stored in said database.

17. The system according to claim 15, wherein options over a plurality of stages for setting said conversational situation are stored in a first area of a subdatabase while said language units are stored in a second area of said subdatabase, and wherein one of said options is successively selected from said first area of said subdatabase to search and to display next-stage options in accordance with the selected option until one of final stage options is selected, and the language unit that corresponds to said selected option is searched from said second area of said subdatabase to be displayed.

* * * * *